United States Patent Office
3,640,982
Patented Feb. 8, 1972

3,640,982
PROCESS FOR THE ELIMINATING OF COMPOUNDS WITH ACID FUNCTION DISSOLVED IN A LIQUID MEDIUM
Claude Gluntz, Ste. Adresse, and Pierre Meyer and Jean Peyrot, Le Havre, France, assignors to Compagnie Francaise de Raffinage, Paris, France
No Drawing. Filed Aug. 19, 1969, Ser. No. 852,154
Claims priority, application France, Aug. 20, 1968, 163,483
Int. Cl. C08f 15/04, 47/24
U.S. Cl. 260—88.2 R                       7 Claims

ABSTRACT OF THE DISCLOSURE

A process for purifying polymeric substances produced by using Ziegler type of catalysts wherein metallic impurities are removed from a solution of the polymeric substance by contacting same with a basic graft polymer grafted onto an inert support. A representative support is poly(tetrafluoroethylene) and a precursor graft monomer is vinylpyridine.

---

This invention relates to a purification process; more particularly, this invention relates to a process for purifying polymeric substances having traces of metals therein and which have been prepared according to Ziegler type polymerization.

In U.S. patent application No. 691,138 filed on Dec. 18, 1967, entitled: "Process for Eliminating Compounds with Acid Function Dissolved in a Liquid Medium," and now abandoned, a process has been described for eliminating metallic elements contained in substances of high molecular weight resulting from polymerization reactions which employ catalysts which contain the said metallic elements, said process being particularly applicable to the purification of polymers obtained according to Ziegler type synthesis. After the preparation of these polymeric substances, these contain traces of metallic compounds in solution, present at times in very small quantities.

It is known that these impurity compounds are so-called "Lewis" acids.

In the said patent application, a method of purification is described which consists in fixing the metallic elements in solution by means of hydrocarbon polymers containing—distributed along the chain—so-called "Lewis base" functions which are accessible to the said elements.

The said patent application also describes a method of regenerating polymers having Lewis base functions. According to this process, it permits a recycling of the polymers with basic functions and thus affords the possibility of effecting "continuously" the purification of the polymers of the Ziegler type.

The object of the present invention is a method in which a novel polymer having basic functions is employed.

The use of this novel polymer eliminates the phase of recovery (by filtration, for instance) of the polymer having these basic functions in the process when used for purification of polymers obtained according to the Ziegler type synthesis.

The object of the present improvement invention is a process of eliminating compounds of acid functions dissolved in a liquid medium in accordance with the aforesaid patent application, characterized by the fact that the liquid to be purified is contacted with a solid substance formed of a polymer having basic functions which is grafted on a support.

Still another object of the present invention is the application of said process to the purification of polymers which have been obtained by Ziegler type polymerization, by elimination—when these polymers are in solution—of the traces of metallic compounds which they contain.

The support must be a compound which is insoluble in the solvents of the polymers obtained by Ziegler type polymerization. This support must be inert with respect to the compounds possessing the acid functions which are to be eliminated. Finally, this support must be stable at the temperatures at which it is used. Supports such as polytetrafluoroethylene, polytrifluorochloroethylene and branched hydrocarbon resins, such as, for instance, styrene divinyl benzene, meet these requirements.

Monomers having basic functions capable of being grafted on the support may be selected from among the substances described in the aforementioned patent application; these monomers may be selected from among the members of the following group: the tertiary amines, the tertiary phosphines, the ethers, the thioethers, the organic sulfides and the simple or multiple heterocycles containing oxygen and/or sulfur and/or nitrogen atoms or groups of atoms all the valences of which are saturated by carbon atoms.

The applicant has obtained particularly interesting results by selecting vinyl-4-pyridine as monomer with basic functions.

In grafting, the monomers with basic functions may be used alone or with another inert monomer, such as, for instance styrene.

The grafting of this monomer on the support is effected according to a free-radical grafting method, for instance by radiation or oxidation, or according to ionic grafting.

The studies carried out by the applicant have, as a matter of fact, unexpectedly shown that these substances, within the temperature range of between 40° C. and 200° C., retain the traces of metals remaining in the polymers obtained by Ziegler type polymerization.

The selection of the temperature is not critical for the polymerization process. It depends essentially on the physical state of the solution of polymers to be purified.

The method of purification in accordance with the invention can be carried out, for instance, by means of one or more thermostatically controlled columns. The solid substance consisting of a polymer having basic functions which is grafted on a support is placed in the column and the mixture of polymers to be purified is then introduced in such a manner as to pass through the said solid substance.

The invention will be illustrated by the following examples, which are in no way limitative.

EXAMPLE I

Preparation of the polymer grafted on a support.

30 g. of powdered polytetrafluoroethylene and 50 g. of vinyl-4-pyridine are placed in a sealed tube. The tube is irradiated for 3 hours at 60° C. with a dose of 56,000 rads/hour.

The polymer which has not been grafted is extracted with boiling ethanol for 24 hours. In this way there are obtained 39 g. of solid substance containing 23% by weight polyvinyl-4-pyridine, referred to the total weight of grafted polymer and support.

Preparation of the Ziegler type polymer.

A copolymer of ethylene and propylene in heptane solution is prepared in the presence of 173 mg. of $VOCl_3$ and 362 mg. of $ClAl(C_2H_5)_2$ as catalysts.

The copolymerization is continued for one hour by passage of the Ziegler type catalyst through the column.

The ethylene-propylene copolymer obtained in solution in heptane is introduced into a column maintained at a temperature of 80° C., into which the polymer grafted on the support has been previously placed.

The ethylene-propylene copolymer, after elution and then evaporation of the heptane, contains less than 10 p.p.m. of vanadium.

EXAMPLE II

The preparation of the polymer grafted on a support is identical to that described in Example I, but it is effected using 30 g. of polytetrafluoroethylene and a mixture of 25 g. of vinyl-4-pyridine and 25 g. of styrene. After extraction, the solid substance contains 10.3% by weight of vinyl-4-pyridine, referred to the total weight of grafted copolymer and support.

This solid substance is placed in a column.

Polyethylene dissolved in xylene is prepared by polymerizing ethylene in xylene in the presence of 450 mg. of $TiCl_4$ and 965 mg. of $ClAl(C_2H_5)_2$.

The polyethylene in xylene solution is introduced into the column maintained at a temperature of 130° C. The polyethylene, after elution and evaporation of the xylene, contains less than 5 p.p.m. of titanium, less than 20 p.p.m. of aluminum and less than 120 p.p.m. of chlorine.

EXAMPLE III

A mixture containing 30 g. of polytetrafluoroethylene, 20 g. of styrene, 20 g. of vinyl-4-pyridine and 40 g. of ethanol is irradiated for 6 hours at 80° C. with a dose of 56,000 rads/hour. Upon extraction there is obtained a solid substance containing 5.6% by weight vinyl-4-pyridine and an equivalent amount of styrene, referred to the total weight of the grafted copolymer and support. This solid substance is placed in a column. Polyethylene dissolved in xylene is prepared in a manner identical to that described in Example II.

After passage through a column maintained at a temperature of 130° C., the polyethylene, after elution and then evaporation of the xylene, contains less than 5 p.p.m. of titanium, less than 20 p.p.m. of aluminum and less than 150 p.p.m. of chlorine.

EXAMPLE IV 100 g. of polytetrafluoroethylene are peroxidized under irradiation with a dose of 500,000 rads/hour in the presence of air. The polytetrafluoroethylene which has thus been peroxidized is heated with 150 g. of vinyl-4-pyridine at 120° C. for 3 hours. The polymer which has not been grafted is extracted with ethanol for 8 hours. There is thus obtained a solid substance containing 11.2% by weight polyvinyl-4-pyridine, referred to the total weight of grafted polymer and support.

This substance is placed in a column.

An ethylene-propylene copolymer in solution in heptane is prepared in a manner identical to that described in Example I.

After passage through the column maintained at 80° C., the ethylene-propylene copolymer, after elution and evaporation of the heptane, contains less than 10 p.p.m. of vanadium.

EXAMPLE V

A styrene-divinyl-benzene resin is chloromethylated until obtaining a content of 18% chlorine by weight. 14 g. of this chloromethylated resin are placed in suspension in 1 liter of toluene, and 36 g. of vinyl-4-pyridine and 55 g. of $SnCl_4$ are added. After agitation for two hours at 20° C., the nongrafted polymer is extracted with ethanol for 8 hours. There are obtained 24.3 g. of solid substance containing 47% by weight polyvinyl-4-pyridine, referred to the total weight of grafted polymer and support.

The solid substance is placed in a column.

An ethylene-propylene in copolymer dissolved in heptane is prepared in a manner identical to that indicated in Example I.

The ethylene-propylene copolymer, after elution through the column maintained at 80° C. and evaporation of the heptane, contains less than 10 p.p.m. of vanadium.

What is claimed is:

1. A process for removing small amounts of Ziegler type of catalysts as impurities from polymeric compounds which are obtained by polymerization in the presence of Ziegler type catalysts, said impurities having Lewis acid type acidic functions and being dissolved in a liquid medium containing said polymeric compounds, said process comprising the steps of: Contacting a solution of said polymeric compound with a solid substance consisting of a polymer having Lewis base type basic functions, and grafted on a support and wherein said polymer having said basic functions is obtained by grafting on said support a monomer having said basic functions selected from the group consisting of tertiary amines, tertiary phosphines, ethers, thioethers, organic sulfides and simple or multiple heterocycles containing atoms or atom groups of oxygen and/or nitrogen and/or sulfur all the valences of which are saturated by carbon atoms; separating said solution and the polymer having basic functions, after the latter has retained the soluble components of the impurities harmful to the polymeric compound; regenerating the polymer having said basic functions; and again contacting said polymer with a new solution of the polymeric compound.

2. A process according to claim 1 in which the said monomer having basic functions is combined with styrene as an inert monomer.

3. The process according to claim 1, in which the said support is selected from the group consisting of polytetrafluoroethylene, polytrifluorochloroethylene and hydrocarbon resins of divinyl benzene or styrene.

4. A process according to claim 1 in which the said substance has been prepared by a method of radical grafting or ionic grafting of the said monomer on the said support.

5. A process according to claim 1, in which the said solution sought to be purified is contacted with the said polymer at a temperature of between about 40° C. and 200° C.

6. A process according to claim 1, in which the graft monomer having a basic function is vinyl-4-pyridine.

7. The process according to claim 1 and wherein the polymeric compound from which the Ziegler type of catalysts are removed as impurities is ethylene homopolymer or copolymers of ethylene and propylene.

References Cited

UNITED STATES PATENTS

| | | | |
|---|---|---|---|
| 2,929,808 | 3/1960 | Ross et al. | 260—94.9 F |
| 2,928,817 | 3/1960 | Neal et al. | 260—94.9 F |
| 3,176,037 | 3/1965 | Warner | 260—475 |
| 3,257,334 | 6/1966 | Chen et al. | 260—2.1 |

JOSEPH L. SCHOFER, Primary Examiner

R. A. GAITHER, Assistant Examiner

U.S. Cl. X.R.

260—2.1 E, 80.78, 94.9 F